(12) United States Patent
Inamori

(10) Patent No.: US 7,739,922 B2
(45) Date of Patent: Jun. 22, 2010

(54) TRIAXIAL FORCE SENSOR AND TRIAXIAL FORCE DETECTION METHOD

(75) Inventor: Dohaku Inamori, Nagano (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 12/155,071

(22) Filed: May 29, 2008

(65) Prior Publication Data

US 2008/0295610 A1      Dec. 4, 2008

(30) Foreign Application Priority Data

May 31, 2007    (JP) .............................. 2007-144969

(51) Int. Cl.
   *G01L 1/22* (2006.01)
(52) U.S. Cl. ................................. 73/862.044
(58) Field of Classification Search ................................
   ........................................... 73/862.041–862.046
   See application file for complete search history.

(56) References Cited

U.S. PATENT DOCUMENTS

| | | | | |
|---|---|---|---|---|
| 3,771,359 A | * | 11/1973 | Shoberg ................ | 73/862.044 |
| 4,745,812 A | * | 5/1988 | Amazeen et al. ....... | 73/862.041 |
| 4,747,313 A | * | 5/1988 | Okada ................... | 73/862.043 |
| 4,911,023 A | * | 3/1990 | Izumi et al. ............ | 73/862.044 |
| 5,490,427 A | * | 2/1996 | Yee et al. ...................... | 73/767 |
| 5,872,320 A | * | 2/1999 | Kamentser et al. ..... | 73/862.044 |
| 6,359,613 B1 | * | 3/2002 | Poole ......................... | 345/161 |
| 6,748,810 B2 | * | 6/2004 | Christensen et al. .......... | 73/795 |
| 6,993,982 B2 | | 2/2006 | Karasawa et al. | |
| 7,441,470 B2 | * | 10/2008 | Morimoto .............. | 73/862.045 |

FOREIGN PATENT DOCUMENTS

| | | |
|---|---|---|
| JP | 2000-267803 A | 9/2000 |
| JP | 2004-212047 A | 7/2004 |
| JP | 2004-239621 A | 8/2004 |

* cited by examiner

*Primary Examiner*—Lisa M Caputo
*Assistant Examiner*—Octavia Davis
(74) *Attorney, Agent, or Firm*—Birch, Stewart, Kolasch & Birch, LLP

(57) ABSTRACT

The detection unit Ud is configured by arranging two strain sensitive elements X1 and X2 respectively at each side of the X-axial direction relative to the center of the strain causing plate 2, and arranging two strain sensitive elements Y1 and Y2 respectively at each side of the Y-axial direction relative to the center of the strain causing plate 2. The signal processing part Um is provided with the X-axial bridge circuit 4 for detecting a force in the X-axial direction by the strain sensitive elements X1 and X2 arranged at the both sides in the X-axial direction, the Y-axial bridge circuit 5 for detecting a force in the Y-axial direction by the strain sensitive elements Y1 and Y2 arranged at both sides in the Y-axial direction, and the Z-axial bridge circuit 6 for detecting a force in the Z-axial direction by a bridge circuit including the X-axial bridge circuit 4 and the Y-axial bridge circuit 5.

20 Claims, 6 Drawing Sheets

TRIAXIAL FORCE SENSOR AND TRIAXIAL FORCE DETECTION METHOD

BACKGROUND OF THE INVENTION

1. Field of the Invention

The present invention relates to a triaxial force sensor and a triaxial force detection method preferably used for detecting forces in the X-axial direction, the Y-axial direction and the Z-axial direction that act on a protruding load action element arranged in the center of one of the surfaces of a strain causing plate.

2. Description of the Relevant Art

Conventionally, a triaxial force sensor composed of a detection element comprising a protruding load action element arranged on one of the surfaces of a strain causing plate and multiple strain sensitive elements arranged on the other surface of the strain causing plate for detecting forces acting on the load action element in the X, Y and Z-axial directions, and a signal processing unit that processes signals from the strain sensitive elements of said detection element is known in Japanese Patent Application Laid-Open Nos. 2004-239621, 2000-267803 and 2004-212047 (U.S. Pat. No. 6,993,982).

A three-dimensional pressure sensor disclosed in No. 2004-239621 is provided with a rod-like stud, a base member for securing the pressure sensor, a bending strain detection plate connected between one end of the rod-like stud and the base member, and a plurality of strain sensors arranged on the surface of the bending strain detection plate; the bending strain detection plate has a cross part wherein the rod-like stud is connected to the center of this cross part; the base member is connected to the periphery of the cross part; the strain sensors are arranged on the surfaces of an upward arm, a right-pointing arm, a downward arm and a left-pointing arm, which form the cross part, respectively; and a signal processing circuit conducts pre-determined arithmetic processing using a strain sensor resistance value when there is no contact pressure applied to the end of the rod-like stud and another strain sensor resistance value when the contact pressure is applied, and outputs the processed contact pressure value.

However, in the three-dimensional pressure sensor disclosed in No. 2004-239621, the number of strain sensitive elements to be used is increased. In this case, a total of sixteen strain sensitive elements are required, causing a cost increase due to an increase in the number of components. Since each strain sensitive element needs to be arranged on the surface of the strain causing plate, there is a limitation to miniaturize the detection unit. In particular, when the sensor is mounted to a fingertip of a robot hand having the same size of a human hand, a corresponding size reduction is required. However, the invention in No. 2004-239621 cannot meet this requirement.

Further, the pointing device disclosed in No. 2000-267803 is equipped with an electrode land in the outer circumference and a post in the center, and it comprises a thin polygonal or circular ceramic substrate provided with four resistors midway between the outer circumference and the center, radially relative to the post, and a pedestal mounting the substrate. The electrode land in the outer circumference of the substrate is electrically connected and fixed to the pedestal by soldering creating a gap between the substrate and the pedestal. When the post is pressed, the substrate bends with the soldered portions of the outer circumference working as supporting points, the resistors are strained and the pressing force on the post is detected. The lower end of the post is provided with a thick pedestal contacting the substrate, and the resistors are arranged at the back side of the substrate which is pressed by the pedestal when the pressing force is applied to the post.

In addition, the stress sensor disclosed in No. 2004-212047 is a stress sensor where strain gauges formed by resistive elements are arranged at four points located on one of two straight lines intersecting perpendicularly at the center of a sensor effective region of a substrate plane, and substantially equidistant from the intersection. The post is fixed or integrated to the substrate plane so as to substantially match the center of the sensor effective region on the substrate plane with the center of the post bottom face. The direction and magnitude of the stress can be determined from a change in the resistance value of the resistive element due to stretch, contraction or compression caused by the stress applied to the post wherein the post bottom part has a protrusion acting on the strain gauge when the stress is applied to the post.

However, although the number of strain sensitive elements is reduced to four in both the pointing device disclosed in No. 2000-267803 and the stress sensor disclosed in No. 2004-212047, the detection method for a force in the Z-axial direction is not disclosed. In other words, in No. 2000-267803, four resistors and electrode wires are arranged on the back surface of the substrate, and even though they are connectable as a bridge circuit and can extract an equal output with regard to the stresses in the X, Y and Z-axial directions, the type of bridge circuit configured by the four resistors is not disclosed. Regarding the reference No. 2004-212047, the arrangement of the four resistive elements and conductors on the back surface of the substrate similar to No. 2000-267803 is shown. At the same time, a bridge circuit formed with these four resistive elements is shown. However, while a stress sensor in the X-axial direction and another stress sensor in the Y-axial direction are formed by the bridge circuit, nothing about the stress sensor in the Z-axial direction is disclosed.

In addition, the triaxial force sensors disclosed in Nos. 2004-239621, 2000-267803 and 2004-212047 all have a problem that a disconnection or loose connection easily occurs to a joint of the detection unit, as well. In other words, although it is necessary to attach to the detection unit a lead which is connected to the strain sensitive element and led to the outside, a tension-compression stress often acts on the joint because the strain causing plate where the strain sensitive elements are attached is strained (bent) by an applied force, and a disconnection caused by a fatigue failure can easily occur. Therefore, it is difficult to assure the detection unit reliability.

SUMMARY OF THE INVENTION

The objective of the present invention is to provide a triaxial force sensor and a triaxial force detection method designed to detect a force in the Z-axial direction by a bridge circuit including the X-axial bridge circuit and the Y-axial bridge circuit without using any strain sensitive elements exclusive for the Z-axial bridge circuit, resulting in a reduction in the number of necessary strain sensitive elements.

Further, another objective of the present invention is to provide a triaxial force sensor and a triaxial force detection method which enable simultaneous realization of a cost reduction and a size reduction by a reduction in the number of strain sensitive elements to be used.

In order to accomplish these objectives, the triaxial force sensor relating to the present invention is a triaxial force sensor where a load action element is arranged in the center of one of the surfaces (first surface) of a strain causing plate. At the same time, multiple strain sensitive elements are arranged on the other surface (second surface) of the strain causing plate to detect forces in the X, Y and Z-axial directions that act on the load action element, wherein the same number of the strain sensitive elements are arranged along the X-axial direction at each side of the center of the strain causing plate and the same number of the strain sensitive elements are arranged along the Y-axial direction at each side of the center of the strain causing plate. In addition, an X-axial bridge circuit for detecting a force in the X-axial direction using the strain sensitive elements arranged in the X-axial direction, a Y-axial bridge circuit for detecting a force in the Y-axial direction using the strain sensitive elements arranged in the Y-axial direction and a Z-axial bridge circuit for detecting a force in the Z-axial direction using a bridge circuit including the X-axial bridge circuit and the Y-axial bridge circuit are formed.

The triaxial force detection method relating to the present invention is characterized by the fact that multiple strain sensitive elements are arranged in the X-axial direction and in the Y-axial direction, respectively, and when detecting forces in the X-axial direction, the Y-axial direction and the Z-axial direction that act on the load action element, the force in the X-axial direction is detected by the X-axial bridge circuit using the strain sensitive element in the X-axial direction and the force in the Y-axial direction is detected by the Y-axial bridge circuit using the strain sensitive element in the Y-axial direction, and the force in the Z-axial direction is detected by the Z-axial bridge circuit that can provide an output signal in response to a change in a combined resistance value of the X-axial bridge circuit and a change in a combined resistance value of the Y-axial bridge circuit.

DETAILED DESCRIPTION OF THE PREFERRED EMBODIMENT

A preferred embodiment relating to the present invention is described in detail hereafter, based on the drawings. Furthermore, the attached drawings are not intended to limit the present invention, but they are only examples to provide an easy understanding of the present invention. Further, for sake of simplicity, detailed descriptions regarding the obvious parts are omitted.

First, the configuration of a triaxial force sensor 1 relating to the embodiment is described with reference to FIG. 1 to FIG. 6.

Figure 2:
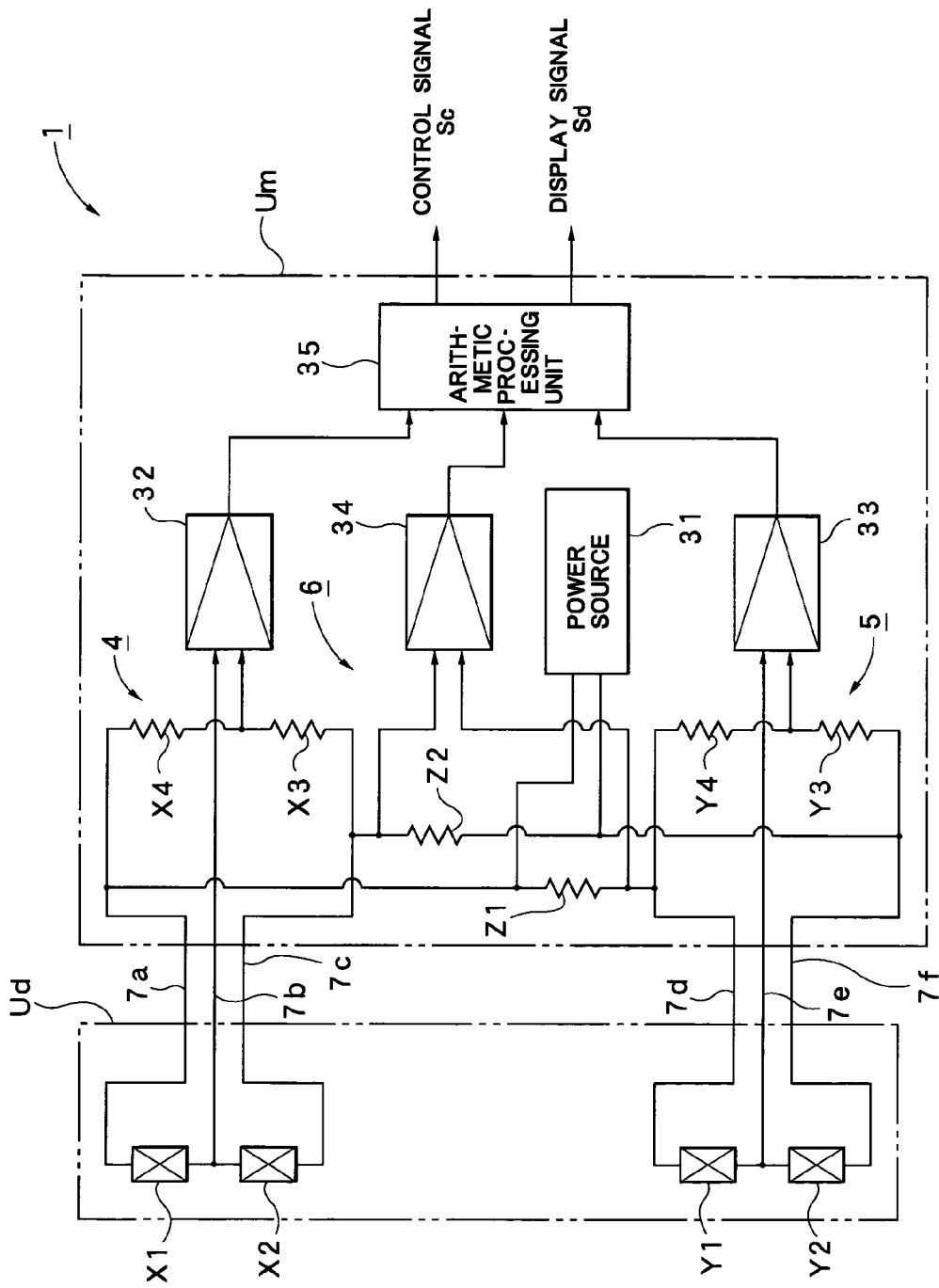
FIG. 2 is an entire electrical diagram of the triaxial force sensor.

The triaxial force sensor comprises a detection unit Ud and a signal processing unit Um, as shown in FIG. 2. The illustrated triaxial force sensor 1 is a hemispherical sensor, wherein the detection unit Ud is mounted at a fingertip of a robot hand having the same size as a human hand, to detect magnitude and direction of a force applied to the fingertip, e.g. when catching an object. Therefore, the diameter (width) of the detection unit Ud should be approximately 7 mm.

Configurations of the detection unit Ud are shown in FIG. 3 to FIG. 6. The detection unit Ud has an strain causing base 11 integrally formed using a synthetic resin material, which comprises a strain causing plate 2, a load action element 3 and four legs 12, 12, 12 and 12. The strain causing plate 2 has a circular shape with a pre-determined thickness, and the square pole shaped load action element 3 is formed protruding in the center of the first surface $2f$ of this strain causing plate 2. Therefore, if an external force is applied to the load action element 3, a strain (bending) occurs to the strain causing plate 2 according to the direction of external force. Further, a hemispherical cover part 13 made of a flexible resin material or a rubber material is provided on the first surface $2f$ of the strain causing plate 2, to cover the entire surface of said first surface $2f$ and the load action element 3.

Figure 4:
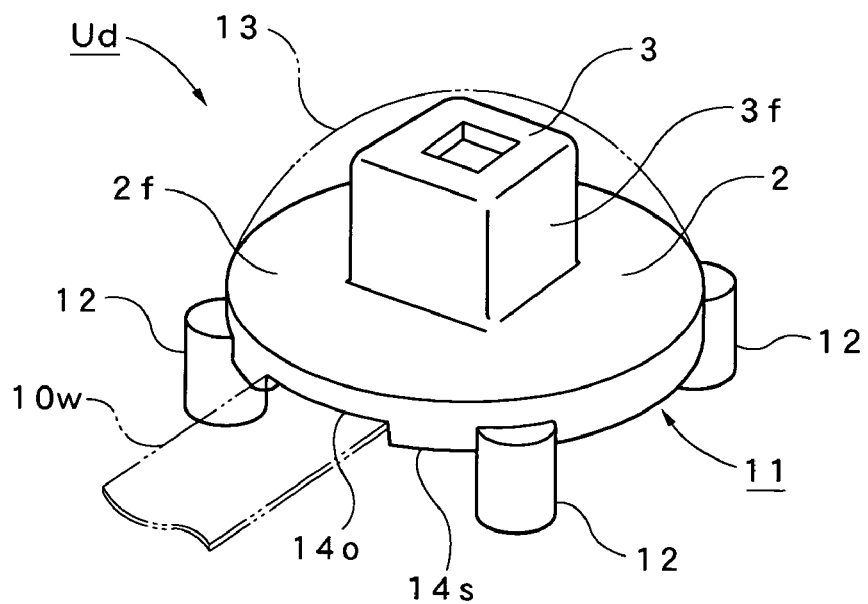
FIG. 4 is a perspective view of a strain causing base of the detection unit in the triaxial force sensor.

A gauge mount 14 is provided on a second surface $2s$ of the strain causing plate 2 which is located at back side of the first surface $2f$. A ring surrounding part $14s$ along the outer circumference is formed on said second surface $2s$. The area inside of the ring surrounding part $14s$ corresponds to the gauge mount 14. Further, a portion of the ring surrounding part $14s$ is removed and a lead guiding part $14o$ shown in FIG. 4 is formed. In addition, the four legs 12 arranged in the circumferential direction at equal intervals are formed around the outer circumference of the strain causing plate 2. The legs 12 are cylindrical, and by protruding the legs toward the second surface $2s$ allows them to have a mounting function and a positioning function when mounting the detection unit Ud to another part.

Figure 3:
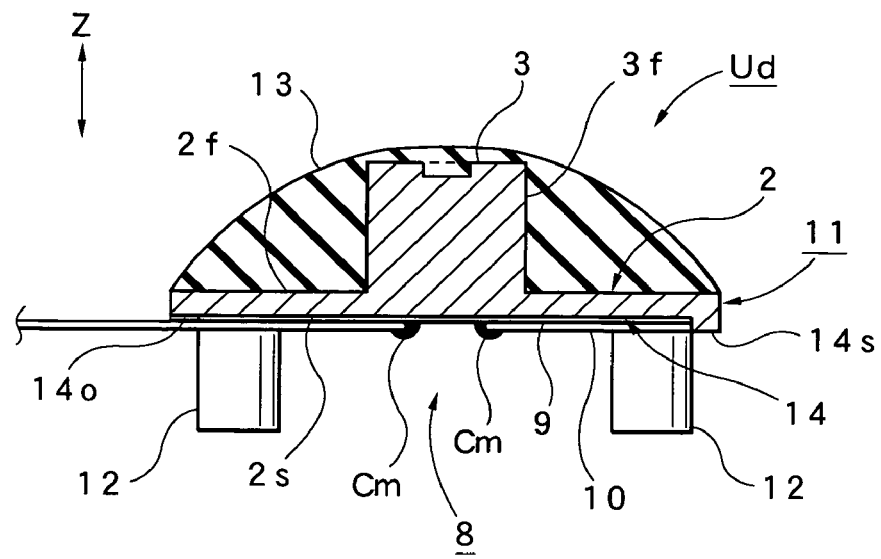
FIG. 3 is a cross sectional side view of a detection unit in the triaxial force sensor.
Figure 5:
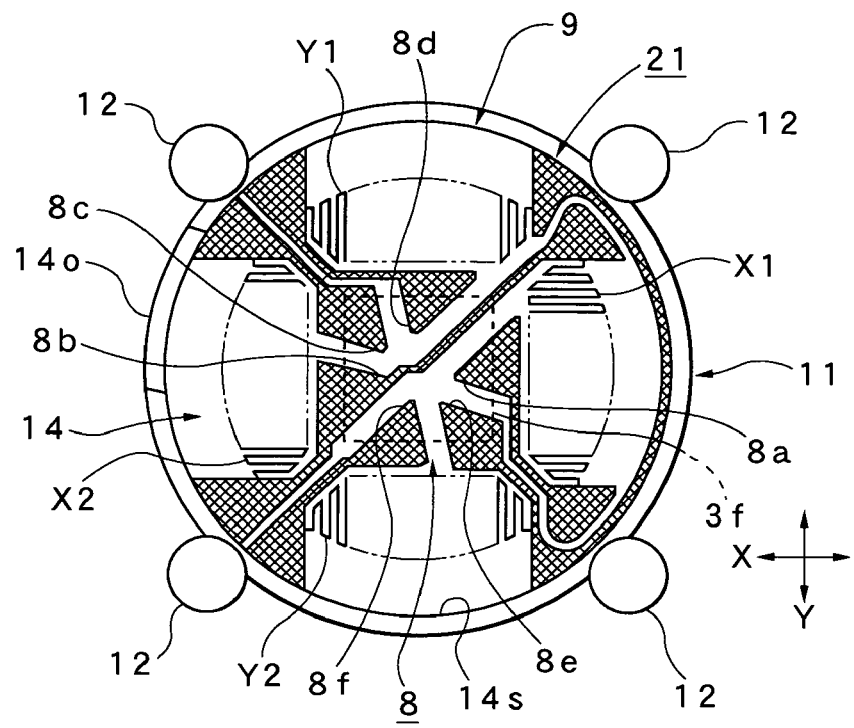
FIG. 5 is a bottom view of the detection unit showing a strain gauge pattern in the triaxial force sensor.

A strain gauge 9 shown in FIG. 5 is bonded to the gauge mount 14 on the second surface $2s$ of the strain causing plate 2, as shown in FIG. 3. The strain gauge 9 is formed to be circular, and when it adheres to the gauge mount 14, it is positioned by the ring surrounding part $14s$.

The strain gauge 9 has four strain sensitive elements X1, X2, Y1 and Y2 printed on a resin film. A wiring pattern 21 is provided extending from both ends of the strain sensitive elements X1, X2, Y1 and Y2, respectively. In this case, the two strain sensitive elements X1 and X2 are arranged along the X-axial direction at each side of the center of the strain causing plate 2, respectively. The other two strain sensitive elements Y1 and Y2 are arranged along the Y-axial direction at each side of the center of the strain causing plate 2, respectively. An insulating film to protect the strain sensitive elements X1, X2, Y1 and Y2, and the wiring pattern 21 printed on the resin film is attached over them so as to expose six joint ends (soldering tabs) $8a$, $8b$, $8c$, $8d$, $8e$ and $8f$, and the strain gauge 9 is finished. The four strain sensitive elements X1, X2, Y1 and Y2 are all arranged to locate outwardly to the lateral surface $3f$ of the load action element 3 and in a region which substantially functions as the strain causing plate 2. Furthermore, although the strain sensitive elements X1, X2, Y1 and Y2 are formed by a grid pattern where reciprocating straight lines are repeated at minute interval, only both ends of the grid pattern are shown in FIG. 3 and the center part is omitted. Further, the wiring pattern 21 configures the circuit of detection unit Ud shown in FIG. 2. In other words, three circuit patterns are extended from the series circuit of the strain sensitive elements X1 and X2. At the same time, three circuit patterns are extended from the series circuit of the strain sensitive elements Y1 and Y2, and the ends of the circuit patterns are gathered to the center of the strain gauge 9 as joint ends (soldering tabs) 8a, 8b, 8c, 8d, 8d and 8f at the side of strain gauge 9. Specifically, the joint 8 at the side of the strain gauge 9 is configured by being arranged closer to the center of the strain causing plate 2 compared to the lateral surface 3f of the load action element 3, and the joint ends 8a, 8b, 8c, 8d, 8e and 8f are arranged toward the center of the strain causing plate 2 and along the circumferential direction, respectively.

Figure 6:
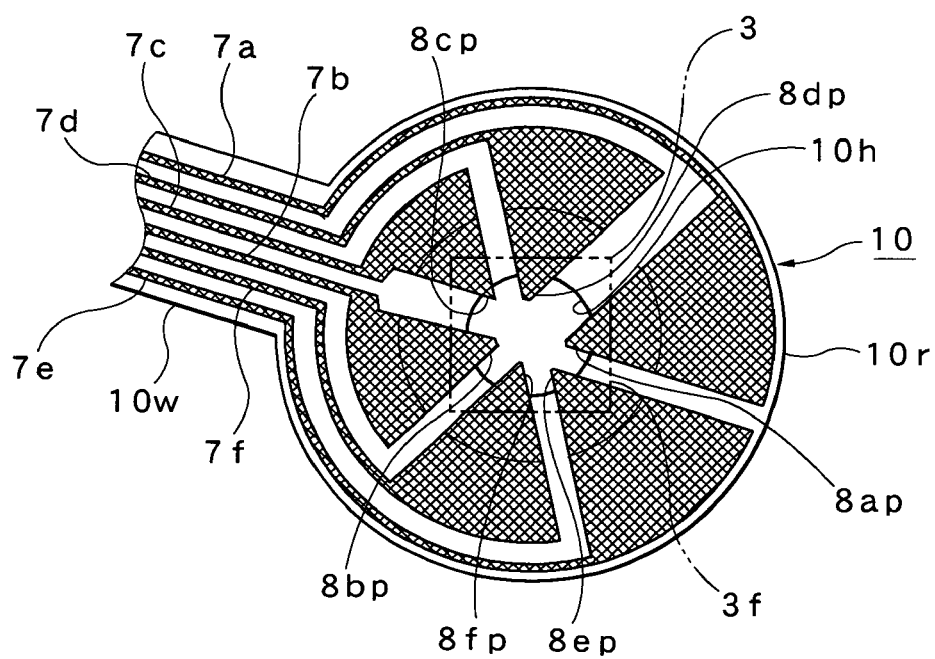
FIG. 6 is a pattern diagram of a lead forming sheet in the triaxial force sensor.

In addition, a lead formation sheet 10 using a flexible printed board shown in FIG. 6 is overlapped with the strain gauge 9 and soldering of the joint 8 is conducted as shown in FIG. 3 so that the lead formation sheet 10 is secured to the strain gauge 9. The lead formation sheet 10 is formed with a circular portion 10r whose diameter is substantially the same as that of the strain gauge 9 and an extended part 10w that is linearly extended from this circular portion 10r in the radial direction. With this design, when the circular portion 10r is overlapped with the strain gauge 9, it is positioned by the ring surrounding part 14s. At the same time, the extended part 10w is led from the lead guiding part 14o outwardly the strain causing plate 11. This lead formation sheet 10 has six printed leads 7a, 7b, 7c, 7d, 7e and 7f, and the ends of the leads 7a, 7b, 7c, 7d, 7e and 7f to be connected to the strain gauge 9 are gathered in the center of the lead formation sheet 10 as joint ends (soldering tabs) 8ap, 8bp, 8cp, 8dp, 8ep and 8fp. Specifically, as shown in FIG. 6, the joint 8 at the side of the lead formation sheet 10 is formed by being arranged closer to the center area compared to the lateral surface 3f of the load action element 3, and the joint ends 8ap, 8bp, 8cp, 8dp, 8ep and 8fp are arranged so as to orient their ends toward the center of the strain causing plate 2 and along the circumferential direction.

Further, as shown in FIG. 6, a hole 10h smaller than the square area defined by the lateral surface 3f of the load action element 3 is formed in the center of the circular part 10r in the lead formation sheet 10, and the joint ends 8ap, 8bp, 8cp, 8dp, 8ep and 8fp in the lead formation sheet 10 are protruded inward the hole 10h, respectively. With this design, when the lead formation sheet 10 is placed onto the strain gauge 9, because the joint ends 8a, 8b, 8c, 8d, 8e and 8f at the side of the strain gauge 9 are located under the hole 10, they are arranged overlapping with the joint ends 8ap, 8bp, 8cp, 8dp, 8ep and 8fp at the side of the lead formation sheet 10, respectively. Since the joint ends 8ap, 8bp, 8cp, 8dp, 8ep and 8fp at the side of the lead formation sheet 10 make contact with the joint ends 8a, 8b, 8c, 8d, 8e and 8f at the side of the strain gauge 9, respectively, as shown in FIG. 3, the contacting joint ends 8ap, 8bp, 8cp, 8dp, 8ep and 8fp and joint ends 8a, 8b, 8c, 8d, 8e and 8f are joined by the soldering part Cm and the joint 8 is formed. Furthermore, the joint ends 8a, etc. at the side of the strain gauge 9 are formed to be slightly larger than the corresponding joint ends 8ap, etc. at the side of the lead formation sheet 10 so that the contour of the joint ends 8a, etc. locates outwardly from the contour of the joint ends 8ap, etc. when the respective joint ends are overlapped. With this configuration, the soldering work can be easily and conveniently realized.

As the joint 8 is defined according to the above description, the joint ends 8a, 8b, 8c, 8d, 8e, 8f, 8ap, 8bp, 8cp, 8dp, 8ep and 8fp can be arranged along the circumferential direction relative to the center of the strain causing plate 2, and the layout where the joint 8 is arranged closer to the center area compared to the lateral surface 3f of the load action element 3 can be easily realized. Then, the positioning of the joint 8 in the area closer to the center compared to the lateral surface 3f of the load action element 3 enables to avoid the effect of the stretching stress applied to the joint 8 caused by the deformation of the strain causing plate 2. Therefore, there are advantages such like disconnection or loose connection at the joint 8 of the detection unit Ud is prevented and the reliability of the detection unit Ud can be secured. In addition, since the strain gauge 9 to be bonded on the second surface 2s of the strain causing plate 2 including the strain sensitive elements X1, X2, Y1 and Y2, and the lead formation sheet 10 to overlap the surface of the strain gauge 9 wherein the leads 7a, 7b, 7c, 7d, 7e and 7f are formed are used, there are advantages that contribute to production ease, and a reduction in number of manufacturing operation and production cost.

Next, a configuration of the signal processing system in the triaxial force sensor 1 including the signal processing unit Um will be described with reference to FIG. 1 and FIG. 2.

Since the detection unit Ud is provided with the four strain sensitive elements X1, X2, Y1 and Y2 as shown in FIG. 2, the two strain sensitive elements X1 and X2 form a series circuit by series-connection, and a total of three ends, which are a common end connecting the strain sensitive elements X1 and X2 and both ends of the series circuit, are connected to the signal processing unit Um via the leads 7a, 7b and 7c. At the same time, the strain sensitive elements Y1 and Y2 form a series circuit by series-connection and a total of three ends, which are a common end connecting the strain sensitive elements Y1 and Y2 and both ends of the series circuit, are connected to the signal processing unit Um via the leads 7d, 7e and 7f.

Figure 1:
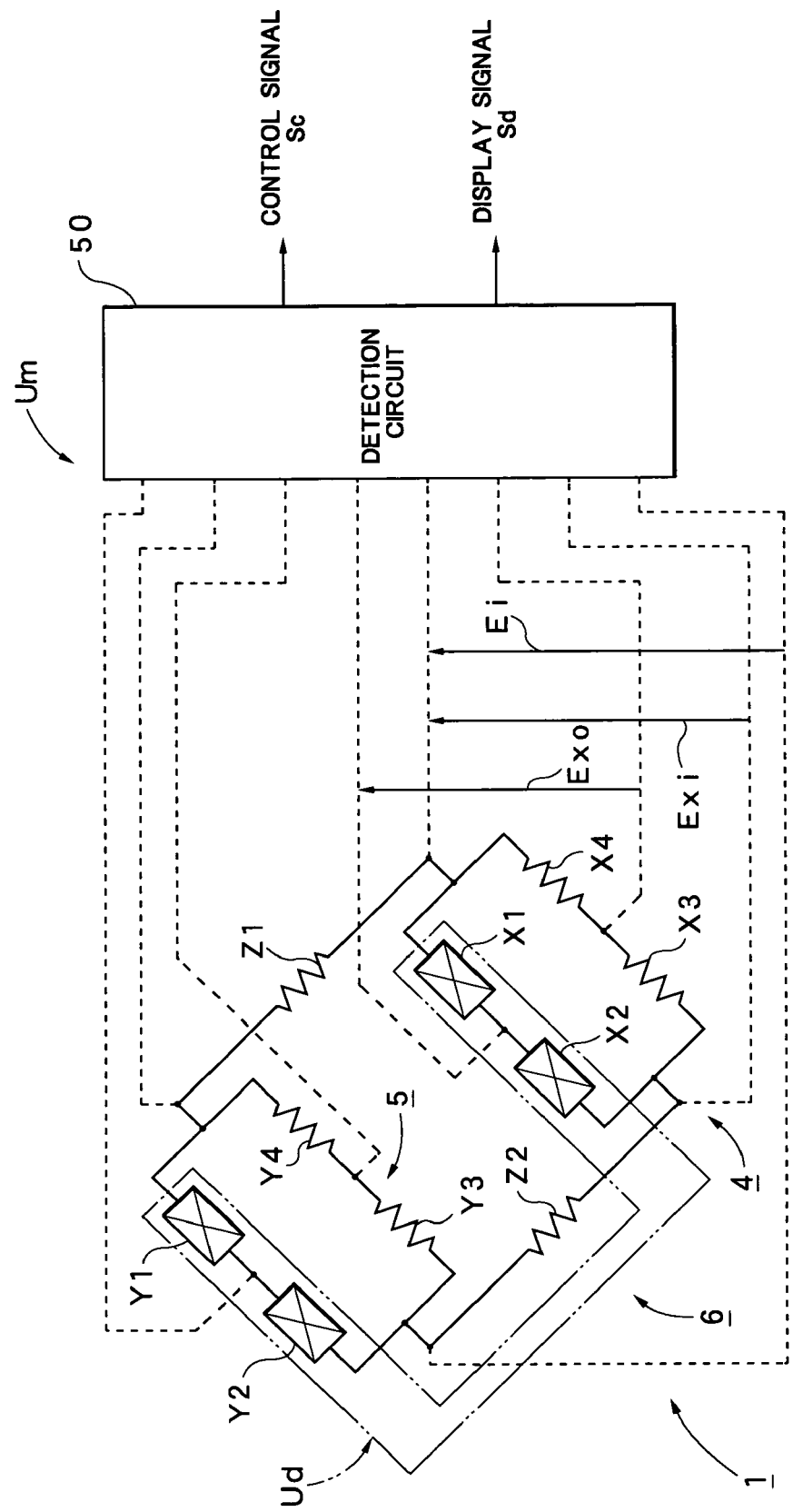
FIG. 1 is an electrical diagram of a bridge circuit configuring primary parts of a triaxial force sensor relating to the preferred embodiment of the present invention.

The signal processing unit Um is provided with series-connected fixed resistors X3 and X4, and the series circuit of these fixed resistors X3 and X4 is connected with the series circuit of the strain sensitive elements X1 and X2 in parallel, and an X-axial bridge circuit 4 formed as a half bridge circuit (a Wheatstone bridge formed by two strain sensitive elements and two fixed resistors) shown in FIG. 1 is configured. Further, the signal processing unit Um is also provided with series-connected fixed resistors Y3 and Y4, and the series circuit of these fixed resistors Y3 and Y4 is connected with the series circuit of the strain sensitive elements Y1 and Y2 in parallel, and a Y-axial bridge circuit 5 formed as a half bridge circuit shown in FIG. 1 is configured. Since the X-axial bridge circuit 4 and the Y-axial bridge circuit 5 can be respectively configured by a half bridge circuit, they can contribute to the cost reduction and the size reduction of the triaxial force sensor 1. In addition, the signal processing unit Um is also provided with fixed resistors Z1 and Z2, and a Z-axial bridge circuit 6 for detecting a force in the Z-axial direction is configured by loop-connecting the X-axial bridge circuit 4, the fixed resistor Z1, the Y-axial bridge circuit 5 and the fixed resistor Z2. In this case, the X-axial bridge circuit 4 and the Y-axial bridge circuit 5 are connected respectively with a pair of opposite sides in the Z-axial bridge circuit 6 by the respective connecting points between the strain sensitive elements and the fixed resistant elements. Further, the fixed resistors Z1 and Z2 are connected respectively to another pair of opposite sides in the Z-axial bridge circuit 6.

Then, in the Z-axial bridge circuit 6, a pair of opposite input ends (a connecting point between the X-axial bridge circuit 4 and the fixed resistive element Z1 and another connecting point between the Y-axial bridge circuit 5 and the fixed resistive element Z2), where an external voltage Ei (see FIG. 1) is input, are connected to a power supply 31 (see FIG. 2) constituting the DC power supply. At the same time, another pair of opposite output ends (a connecting point between the X-bridge circuit 4 and the fixed resistive element Z2 and another connecting point between the Y-axial bridge circuit 5 and the fixed resistive element Z1) in the Z-axial bridge circuit 6 are connected to the input part of an amplifier 34. Further, a pair of opposite output ends (a connecting point between the strain sensitive elements X1 and X2 and another connecting point between the fixed resistive elements X3 and X4) in the X-axial bridge circuit 4 are connected to an input part of an amplifier 32. At the same time, a pair of opposite output ends (a connecting point between the strain sensitive elements Y1 and Y2 and another connecting point between the fixed resistive elements Y3 and Y4) in the Y-axial bridge circuit 5 is connected to the input part of an amplifier 33. In addition, the output parts of the amplifiers 32, 33 and 34 are connected to the input part of the arithmetic processing unit 35, respectively. A control signal Sc and a display signal Sd are transmitted from this arithmetic processing unit 35. Furthermore, the reference number 50 in FIG. 1 represents a detection circuit in the triaxial force sensor 1 excluding the X-axial bridge circuit 4, the Y-axial bridge circuit 5 and the Z-axial bridge circuit 6.

Figure 7:
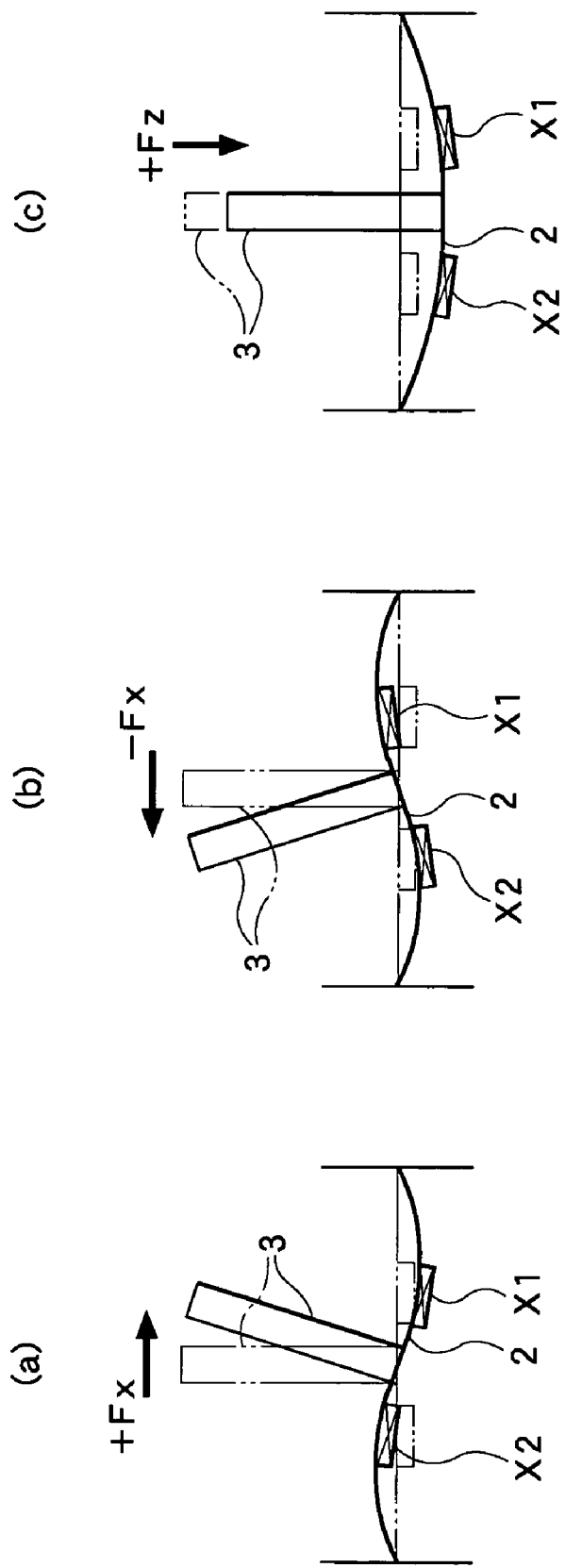
FIG. 7 is a pattern diagram for explaining the action of the triaxial force sensor.
Figure 8:
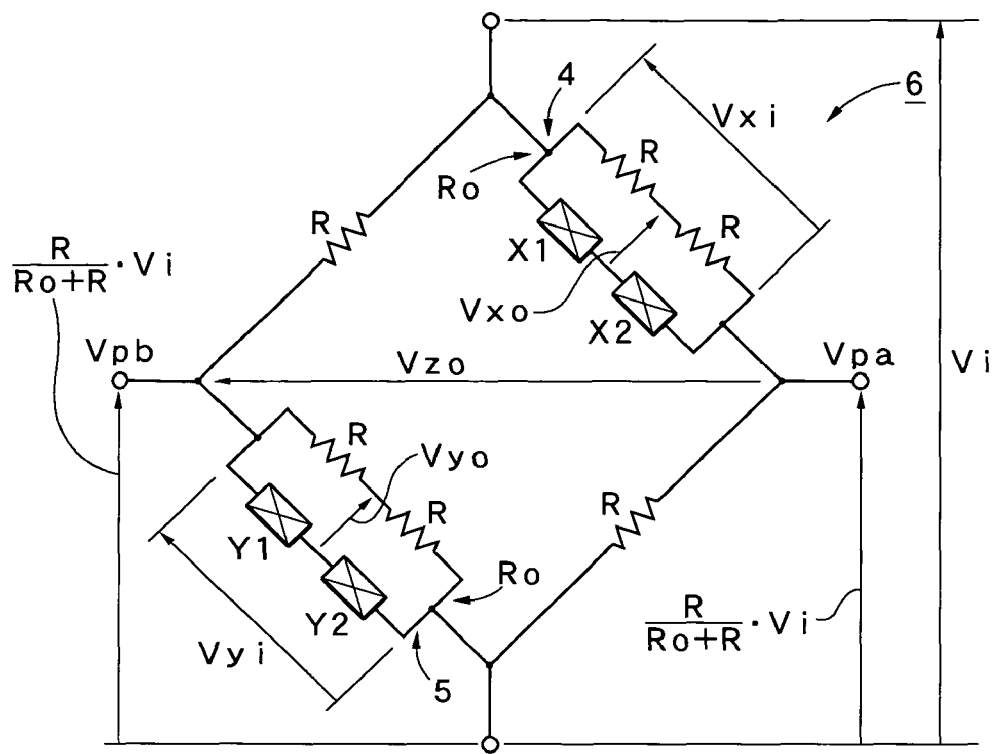
FIG. 8 is a circuit diagram for explaining the action of the triaxial force sensor.
Figure 9:
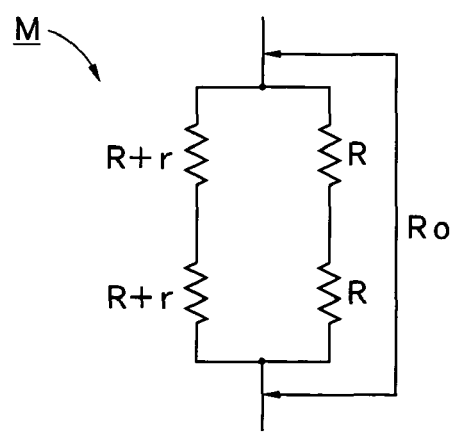
FIG. 9 is a circuit diagram for explaining the action of the triaxial force sensor.

Next, the operation (action) of the triaxial force sensor 1 according to the present embodiment will be described based upon FIG. 7 to FIG. 9 with reference to FIG. 1 to FIG. 6.

First, the operation of the X-axial bridge circuit 4 will be described, assuming that a component force in the X-axial direction acts on the load action element 3. FIG. 7(a) shows a condition where a component force +Fx acts on the load action element 3 in the X-axial direction. The component force +Fx causes a deformation to the strain causing plate 2 which induces strains +εx and −εx, of the same magnitude but opposite signs to the strain sensitive elements X1 and X2, respectively. When the resistance values in the X-axial bridge circuit 4 become imbalanced due to these strains, the output voltage Exo in the output end of the X-axial bridge circuit 4 is expressed as follows according to a known arithmetic expression:

$$Exo = K \cdot Exi/4(0 + (+\varepsilon x) - (-\varepsilon x) + 0)$$
$$= K \cdot Exi/4(2\varepsilon x)$$

wherein K represents the gauge factor and Exi represents the input voltage applied to the X-axial bridge circuit 4; and the output voltage Exo, which is proportional to twice the strain (εx) caused by the component force +Fx, can be obtained. FIG. 7(b) shows a condition where a component force −Fx acts on the load action element 3 in the X-axial direction, and the condition is the same as in FIG. 7(a) except that the direction of action is opposite. In the meantime, FIG. 7(c) shows a condition where a component force +Fz acts on the load action element 3 in the Z-axial direction. In this case, the component force +Fz causes a deformation to the strain causing plate 2 which induces strains +εz and +εz of the same magnitude and same sign to the strain sensitive elements X1 and X2, respectively. For these strains, the output voltage Exo at the output end of the X-axial bridge circuit 4 is expressed as follows:

$$Exo = K \cdot Exi/4(0 + (+\varepsilon z) - (+\varepsilon z) + 0)$$
$$= K \cdot Exi/4(0)$$
$$= 0$$

Therefore, an interference output to the X-bridge circuit 4 due to the component force in the Z-axial direction will not be generated. Further, since the strain sensitive elements Y1 and Y2 are on the neutral axis, an interference output to the X-bridge circuit 4 due to the component force in the Y-axial direction will also not be generated. The operation of the X-axial bridge circuit 4 was described above, and since the operation of the Y-axial bridge circuit 5 is similar, the detailed description with respect to Y-axial bridge circuit 5 will be omitted.

Next, the operation of the Z-axial bridge circuit 6 will be described. Firstly, it is assumed that the component force +Fz acts on the load action element 3 in the Z-axial direction. In this case, because the strains with the same magnitude and sign occur at the strain sensitive elements X1 and X2, no output due to the component force +Fz will be generated in the X-axial bridge circuit 4. However, the resistance values of the strain sensitive elements X1 and X2 are changed. In the meantime, the combined resistance value Rx measured at a pair of diagonal corners of the X-axial bridge circuit 4 is expressed as follows:

$$Rx = ((R1+R2) \cdot (R3+R4))/((R1+R2)+(R3+R4)) \quad \text{(Equation 1)}$$

wherein, R1, R2, R3 and R4 represent the resistance values in the strain sensitive elements X1 and X2 and the fixed resistors X3 and X4, respectively. Therefore, if the resistance values of the strain sensitive elements X1 and X2 are changed, the combined resistance value Rx is also changed.

Similarly, although no output due to the component +Fz in the Y-axial bridge circuit 5 is also generated, the resistance values of the strain sensitive elements Y1 and Y2 are changed, and the combined resistance value Ry, measured at a pair of the diagonal corners in the Y-axial bridge circuit 5, is also changed. Therefore, the assembly of a bridge circuit that can detect the changes of these combined resistance values Rx and Ry enables the detection of the output to the component force +Fz.

In other words, the X-axial bridge circuit 4 and the Y-axial bridge circuit 5 are regarded as the strain sensitive elements in the Z-axial direction, and the Z-axial bridge circuit 6 including the X-axial bridge circuit 4 and the Y-axial bridge circuit 5 can be realized by the assembly of the X-axial bridge circuit 4 and the Y-axial bridge circuit 5 to a pair of opposite sides of the Z-axial bridge circuit 6 respectively, as shown in FIG. 1. With this assembly, since the amounts of change in the combined resistance values of the X-axial bridge circuit 4 and the Y-axial bridge circuit 5 to the component force in the Z-axial direction become the same sign, the connection of the X-axial bridge circuit 4 and the Y-axial bridge circuit 5 to a pair of the opposite sides in the Z-axial bridge circuit 6, respectively, enables the detection of the component force in the Z-axial direction. Furthermore, in the X-axial bridge circuit 4, the component force in the X-axial direction can be detected when the balance of the resistance values is lost; however, as the amounts of change in the resistance values of the strain sensitive elements X1 and X2 in the X-axial bridge circuit 4 have opposite signs and the same magnitude, the combined resistance value Rx in the equation 1 is not changed; therefore, the output in the Z-axial bridge circuit 6 will not be generated. Similarly, although the component force in the Y-axial direction can be detected in the Y-axial bridge circuit 5 when the balance of the resistance values is lost as well, because the amounts of change in the resistance values of the strain sensitive elements Y1 and Y2 in the Y-axial bridge circuit 5 have opposite signs and the same magnitude, the combined resistance value Ry will not be changed; therefore, no output of the Z-axial bridge circuit 6 will be generated.

Next, the interference mechanism in the Z-axial bridge circuit 6 will be studied, and a consideration about its effect will be provided. FIG. 8 shows the resistance values and voltage values where the resistance values of the strain sensitive elements X1, X2, Y1 and Y2 and the fixed resistors X3, X4, Y3, Y4, Z1 and Z2 are all equal to a resistance value R in the X-axial bridge circuit 4, the Y-axial bridge circuit 5 and the Z-axial bridge circuit 6 shown in FIG. 1. It is assumed that a force is applied in the Z-axial direction and the resistance value R of the strain sensitive elements X1, X2, Y1 and Y2 is changed by a resistance value r. In this case, an equivalent circuit M of the X-axial bridge circuit 4 (the same in the Y-axial bridge circuit 5) becomes as shown in FIG. 9, and a combined resistance value Ro of the equivalent circuit M is expressed as follows:

$$Ro = 2R \cdot (2R + 2r)/(2R + 2R + 2r)$$
$$= 2R \cdot (R + r)/(2R + r)$$

Therefore, in the Z-axial bridge circuit 6 shown in FIG. 8, the relationship between applied voltage Vi and output voltage Vzo is expressed as follows:

$$Vzo = (Ro/(Ro + R) - R/(Ro + R)) \cdot Vi$$
$$Vzo/Vi = (Ro - R)/(Ro + R)$$
$$= ((2R \cdot (R + r)/(2R + r)) - R)/((2R \cdot (R + r)/(2R + r)) + R)$$
$$= (r/R)/(4 + 3(r/R))$$

Here, since Vzo/Vi corresponds to r/R one on one, the resistance value r can be obtained by detecting Vzo/Vi. In this case, the resistance value r may be obtained by the calculation based on the above equation, or a data table may be prepared and stored in a not-shown memory, and the resistance value r corresponding to the detection result of Vzo/Vi may be read.

On the basis of these points, a case of detecting the component force in the Z-axial direction will be described.

First, Vxi in the X-axial bridge circuit 4 is expressed from FIG. 8 as follows:

$$Vxi = (1 - R/(Ro + R)) \cdot Vi$$
$$= (Ro/(Ro + R)) \cdot Vi$$

Further, this expression can be converted according to the above-mentioned expression regarding Vzo/Vi as follows:

$$Vzo/Vi = (Ro-R)/(Ro+R)$$

$$Ro = R \cdot (Vi+Vzo)/(Vi-Vzo)$$

Therefore, the following expression can be obtained:

$$Vxi = (1 - R/(R \cdot (Vi + Vzo)/(Vi - Vzo) + R)) \cdot Vi$$
$$= (Vi + Vzo)/2$$

In the meantime, Vyi in the Y-axial bridge circuit 5 can be expressed according to FIG. 8 as follows:

$$Vyi = (Ro/(Ro+R)) \cdot Vi$$

Further, the expression can be converted according to the above-mentioned expression regarding Vzo/Vi as follows:

$$Vyi = ((R \cdot (Vi + Vzo)/(Vi - Vzo))/(R \cdot (Vi + Vzo)/(Vi - Vzo) + R)) \cdot Vi$$
$$= (Vi + Vzo)/2$$

Regarding the sign of Vzo, considering Vzo=Vpb-Vpa, and assuming that the sign is positive when the resistance values of the strain sensitive elements X1 and X2 become greater, the change in the resistance values of the strain sensitive elements X1 and X2 due to the strains in the X-axial direction and the Y-axial direction is calculated. As Vzo affects the input voltage Vxi and the input voltage Vyi of the X-axial bridge circuit 4 and the Y-axial bridge circuit 5 respectively, it is necessary to take the output voltage Vzo into consideration in addition to the output voltage Vxo and the output voltage Vyo relative to the X-axial direction and the Y-axial direction.

It is assumed that the voltage value of the strain sensitive element X1 in the X-axial bridge circuit 4 is changed by +xr and the resistance value of the strain sensitive element X2 is changed by -xr. In this case, Vxo can be expressed as follows:

$$Vxo = \{(Vi + Vzo)/(2 \cdot 2)\} - \{((R - xr)/(2 \cdot R)) \cdot ((Vi + Vzo)/2)$$
$$= ((xr/R) \cdot (Vi + Vzo))/4$$

According to the above-mentioned expression, xr can be expressed as follows:

$$xr = ((4 \cdot Vxo)/(Vi+Vzo)) \cdot R$$

Thus if Vxo and Vzo are detected at the time of applying the applied voltage Vi are obtained, xr can be obtained.

Similarly with the Y-axial bridge circuit 5, if the resistance value of the strain sensitive element Y1 in the Y-axial bridge circuit 5 is changed by +yr and the resistance value of the strain sensitive element Y2 is changed by -yr, yr can be obtained with the following expression:

$$yr = ((4 \cdot Vyo)/(Vi+Vzo)) \cdot R$$

Thus, if Vyo and Vzo at the time of applying the applied voltage Vi are obtained, yr can be obtained.

Since the Z-axial bridge circuit 6 including the X-axial bridge circuit 4 and the Y-axial bridge circuit 5 acts with this principle, an interference error on the circuit due to the effect of the output voltage Vzo in the Z-axial bridge circuit 6 is generated to the output voltage Vxo and the output voltage Vyo in the X-axial bridge circuit and the Y-axial bridge circuit; however, the interference error on the circuit can be eliminated by correcting Vxo and Vyo from Vzo using the above-mentioned expression.

Further, the interference error to Vxo (Vyo) by Vzo is actually within the negligible range due to the reasons described below. In the present invention, the maximum strain received by the strain sensitive element is approximately 1500µε. For example, when the resistance of the strain sensitive elements X1 and X2 is 1000Ω, the strain amount εx in the X-axial direction is 1500µε, the applied voltage Vi to the Z-axial bridge circuit 6 is 10V and the gauge factor K is 2, in the X-axial bridge circuit 4, a change in the resistance value: xr=R·K·εx=3Ω is generated and the combined resistance Ro of the X-axial bridge circuit 4 in the Z-axial bridge circuit 6 becomes 1001.5Ω. In this case, the input voltage Vxi of the X-axial bridge circuit 4 is as follows: Vxi=10·(1001.5/(1001.5+1000))=5.00375V. Therefore, a rate of increase is 0.00375/5=0.075%, and the output voltage Vxo will receive 0.075% of output interference error. However, the output interference error due to the unique configuration in the bridge circuit of the present invention is in a sufficiently negligible level if taking into consideration the fact that the total interference error in a conventional triaxial force sensor with relatively high accuracy currently in practical use, where each bridge circuit is independent, is approximately 5%. This is similar in the Y-axial bridge circuit 5.

Therefore, the operations (actions) of the X-axial bridge circuit 4 and the Y-axial bridge circuit 5, in addition to the Z-axial bridge circuit 6 including the X-axial bridge circuit 4 and the Y-axial bridge circuit 5 in the opposite sides configuring the triaxial force sensor 1 relating to this embodiment are summarized as follows:

(a) In the X-axial bridge circuit 4, since the action of the component Fx in the X-axial direction causes the loss of a resistance value balance in the X-axial bridge circuit 4, the output of the X-axial bridge circuit 4 is detected and Fx can be obtained.

(b) In the Y-axial bridge circuit 5, since the action of the component Fy in the Y-axial direction causes the loss of a resistance value balance in the Y-axial bridge circuit 5, the output of the Y-axial bridge circuit 5 is detected and Fy can be obtained.

(c) In the Z-axial bridge circuit 6, since the action of the component Fz in the Z-axial direction causes the change of the combined resistance value Rx of the X-axial bridge circuit 4 and the combined resistance value Ry of the Y-axial bridge circuit 5, respectively, and the loss of a resistance value balance in the Z-axial bridge circuit 6, the output of the Z-axial bridge circuit 6 is detected and Fz can be obtained.

Table 1 shows verification data of the triaxial force sensor 1 (prototype) shown in FIG. 3 to FIG. 6. In this verification data, outputs Exs, Eys and Ezs per unit of applied voltage in the bridge circuits 4, 5 and 6 are obtained when Vi is 5 V and 200 g of external force is sequentially applied to each axial direction.

TABLE 1

| Unit [mV/V] | | Direction of action of external force (200 g) | | |
|---|---|---|---|---|
| | | X axis | Y axis | Z axis |
| X-axial bridge circuit output | Exs | 0.110 | 0.032 | 0.020 |
| Y-axial bridge circuit output | Eys | 0.014 | 0.152 | 0.008 |
| Z-axial bridge circuit output | Ezs | 0.004 | 0.008 | −0.090 |

Therefore, according to the triaxial force sensor 1 relating to this embodiment, since the triaxial force sensor 1 is provided with the Z-axial bridge circuit 6 for acquiring a force in the Z-axial direction by the bridge circuit including the X-axial bridge circuit 4 and the Y-axial bridge circuit 5, a total of four is sufficient as the quantity of the strain sensitive elements X1, X2, Y1 and Y2. Therefore, the cost reduction can be realized by reduced necessary quantity of the strain sensitive elements X1, X2, Y1 and Y2. At the same time, the size reduction of the detection unit Ud can be realized, and particularly, a small-sized detection unit Ud (approximately 7 mm of diameter) to be mounted at a fingertip of a robot hand with the same size of a human hand can be easily realized.

The preferred embodiment was described in detail. However, the present invention is not limited to the embodiment, and the configuration of details, the shape, the quantity and the numerical values can be modified, added or deleted without departing from the scope of the present invention. For example, a case was illustrated in which the strain causing substrate 11 is made of a synthetic resin material. However, it can be formed using other materials, such as metal material including various alloys or ceramic material. At the same time, a case was shown in which the strain sensitive elements X1, X2, Y1 and Y2 are formed together in one strain gauge 9. However, this does not eliminate other assembly modes. For example, the number of the strain sensitive elements can be increased depending upon the intended use. Further, it is also possible to include partially or all of the fixed resistive elements in the strain gauge 9. In addition, the necessary number of strain gauges including one strain sensitive element may be used. Further, for the strain gauge 9, a case that the strain sensitive elements X1, X2, Y1 and Y2 and the wiring pattern 21 are printed onto a flexible resin film was shown. However, various techniques, such as photo-etching, printing, deposition or sputtering, can be utilized for this printed formation.

Furthermore, the triaxial force sensor 1 relating to the present invention can be utilized for various uses as long as the use is to simultaneously detect forces (external forces) acting in the X-axial direction, the Y-axial direction and the Z-axial direction, such as various machines or a joystick in a game console, in addition to the illustrated case of mounting to the fingertip of a robot hand.

What is claimed is:

1. A triaxial force sensor comprising:
   a protruding load action element provided on a center of one surface of a strain causing plate part; and
   a plurality of strain sensitive elements arranged on the other surface of the strain causing plate part for detecting strains in an X-axial direction, a Y-axial direction, each of the plurality of strain sensitive elements in the X-direction and in the Y-direction being formed by a grid pattern of reciprocating straight lines, and
   a Z-axial direction caused by a force acting on the load action element,
   wherein the same number of strain sensitive elements are arranged at one side and the other side in the X-axial direction relative to the center of the strain causing plate part, and the same number of the strain sensitive elements are arranged at one side and the other side in the Y-axial direction relative to the center of the strain causing plate part;
   thus an X-axial bridge circuit for detecting a component of force in the X-axial direction is formed with the strain sensitive elements arranged at the one side and the other side in the X-axial direction; and a Y-axial bridge circuit for detecting a component of force in the Y-axial direction is formed with the strain sensitive elements arranged at the one side and the other side in the Y-axial direction; and
   an entirety of the X-axial bridge circuit and an entirety of the Y-axial circuit being connected by a pair of opposite sides, respectively; and
   a Z-axial bridge circuit for detecting a component of force in the Z-axial direction by an output signal obtained in accordance with a change in a combined resistance value of the X-axial bridge circuit and a change in the combined resistance value of the Y-axial bridge circuit.

2. The triaxial force sensor according to claim 1 wherein:
   the X-axial bridge circuit and the Y-axial bridge circuit are formed by a half bridge circuit respectively.

3. The triaxial force sensor according to claim 1 comprising:
a detection unit configured by arranging the strain sensitive elements in the strain causing plate part;
a signal processing unit that processes output signals from the X-axial bridge circuit, the Y-axial bridge circuit and the Z-axial bridge circuit, wherein
at least one of fixed resistive elements included in the X-axial bridge circuit, the Y-axial bridge circuit or the Z-axial bridge circuit is a fixed resistive element arranged in the signal processing unit.

4. The triaxial force sensor according to claim 3, wherein:
the detection unit comprises a plurality of leads joined to the strain sensitive elements and led to the outside, and a joint part joining the leads and the strain sensitive elements is arranged to be closer to the center of the strain causing plate part than where an outer surface of the load action element is arranged.

5. The triaxial force sensor according to claim 4, wherein a plurality of joint ends in the joint part are arranged along a circumferential direction relative to the center of the strain causing plate part.

6. The triaxial force sensor according to claim 3, wherein:
the detection unit comprises
a strain gauge comprising the plurality of strain sensitive elements and adhered onto the other surface of the strain causing plate part, and
a lead formation sheet forming the leads and joined to the strain gauge.

7. The triaxial force sensor according to claim 6, wherein:
the strain gauge comprises four strain sensitive elements printed onto a resin film.

8. The triaxial force sensor according to claim 7, wherein the reciprocating straight lines in each of the strain sensitive elements are repeated at minute intervals, and outer ends of the reciprocating straight lines are arranged in an arc-shaped pattern.

9. The triaxial force sensor according to claim 7, wherein the grid pattern of the strain sensitive elements arranged on the one side in the X-axial direction relative to the strain causing plate part is disposed directly opposite to the grid pattern of the strain sensitive elements the other side in the X-axial direction relative to the strain causing plate part.

10. The triaxial force sensor according to claim 6, wherein:
the lead formation sheet is a flexible printed board overlapped onto the strain gauge, and secured to the strain gauge by a soldering joint at the joint part.

11. The triaxial force sensor according to claim 3, wherein:
the detection unit comprises
a ring surrounding part formed along the outer circumference on the other surface of the strain causing plate part, and
a gauge mount area defined inside the ring surrounding part.

12. The triaxial force sensor according to claim 11, wherein:
the detection unit has a lead guiding part formed by removing a portion of the ring surrounding part.

13. The triaxial force sensor according to claim 3, wherein:
the detection unit configures a hemispherical sensor to be mounted at a fingertip of a robot hand for detecting a magnitude and a direction of a force applied to the fingertip.

14. The triaxial force sensor according to claim 13, wherein:
the detection unit comprises a circular strain causing plate part having a pre-determined thickness, and a load action element formed in the center of the one surface of the circular strain causing plate part.

15. The triaxial force sensor according to claim 14, wherein:
the detection unit has a hemispherical part made of a flexible resin material or a rubber material for covering at least the one surface of the strain causing plate part and the load action element.

16. A triaxial force detection method for detecting force components in an X-axial direction, a Y-axial direction, and a Z-axial direction acting on a load action element, the method comprising:
arranging a plurality of strain sensitive elements in the X-direction and in the Y-direction of a strain causing plate part, each of the plurality of strain sensitive elements in the X-direction and in the Y-direction being formed by a grid pattern of reciprocating straight lines; and
detecting a force component in the X-axial direction by an X-axial bridge circuit using the strain sensitive elements in the X-axial direction;
detecting a force component in the Y-axial direction by a Y-axial bridge circuit using the strain sensitive elements in the Y-axial direction;
an entirety of the X-axial bridge circuit and an entirety of the Y-axial circuit being connected by a pair of opposite sides, respectively; and
detecting a force component in the Z-axial direction by a Z-axial bridge circuit in which an output signal in accordance with a change in a combined resistance value of the X-axial bridge circuit and a change in a combined resistance value of the Y-axial bridge circuit.

17. The triaxial force detection method according to claim 16, wherein the X-axial bridge circuit and the Y-axial bridge circuit are formed with a half bridge circuit, respectively.

18. The triaxial force detection method according to claim 16, wherein the reciprocating straight lines in each of the strain sensitive elements are repeated at minute intervals, and outer ends of the reciprocating straight lines are arranged in an arc-shaped pattern.

19. The triaxial force detection method according to claim 16, wherein the grid pattern of the strain sensitive elements arranged on the one side in the X-axial direction relative to the strain causing plate part is disposed directly opposite to the grid pattern of the strain sensitive elements the other side in the X-axial direction relative to the strain causing plate part.

20. A triaxial force sensor comprising:
a protruding load action element provided on a center of one surface of a strain causing plate part; and
a plurality of strain sensitive elements arranged on the other surface of the strain causing plate part for detecting strains in an X-axial direction, a Y-axial direction, and a Z-axial direction caused by a force acting on the load action element,
wherein the same number of strain sensitive elements are arranged at one side and the other side in the X-axial direction relative to the center of the strain causing plate part, and the same number of the strain sensitive elements are arranged at one side and the other side in the Y-axial direction relative to the center of the strain causing plate part;
thus an X-axial bridge circuit for detecting a component of force in the X-axial direction is formed with the strain sensitive elements arranged at the one side and the other side in the X-axial direction; and a Y-axial bridge circuit for detecting a component of force in the Y-axial direction is formed with the strain sensitive elements arranged at the one side and the other side in the Y-axial direction; and an entirety of the X-axial bridge circuit and an entirety of the Y-axial circuit being connected by a pair of opposite sides, respectively; and a Z-axial bridge circuit for detecting a component of force in the Z-axial direction by an output signal obtained in accordance with a change in a combined resistance value of the X-axial bridge circuit and a change in the combined resistance value of the Y-axial bridge circuit;

a detection unit configured by arranging the strain sensitive elements in the strain causing plate part;

a signal processing unit that processes output signals from the X-axial bridge circuit, the Y-axial bridge circuit and the Z-axial bridge circuit, wherein at least one of fixed resistive elements included in the X-axial bridge circuit, the Y-axial bridge circuit or the Z-axial bridge circuit is a fixed resistive element arranged in the signal processing unit;

wherein the detection unit comprises a ring surrounding part formed along the outer circumference on the other surface of the strain causing plate part, and a gauge mount area defined inside the ring surrounding part.

* * * * *